United States Patent
Prunotto

(10) Patent No.: US 10,039,352 B2
(45) Date of Patent: Aug. 7, 2018

(54) BEACH UMBRELLA ANCHOR WITH AN INTEGRAL SHOVEL

(71) Applicant: Anthony Prunotto, Nolwalk, CT (US)

(72) Inventor: Anthony Prunotto, Nolwalk, CT (US)

( * ) Notice: Subject to any disclaimer, the term of this patent is extended or adjusted under 35 U.S.C. 154(b) by 0 days.

(21) Appl. No.: 15/404,543

(22) Filed: Jan. 12, 2017

(65) Prior Publication Data

US 2018/0195311 A1    Jul. 12, 2018

(51) Int. Cl.
| | | |
|---|---|---|
| *A45B 11/00* | (2006.01) |
| *E04H 15/62* | (2006.01) |
| *E04H 15/28* | (2006.01) |
| *A01B 1/02* | (2006.01) |
| *A45B 25/22* | (2006.01) |
| *A45B 23/00* | (2006.01) |

(52) U.S. Cl.
CPC ............ *A45B 11/00* (2013.01); *A01B 1/02* (2013.01); *A45B 25/22* (2013.01); *E04H 15/28* (2013.01); *E04H 15/62* (2013.01); *A45B 2023/0012* (2013.01)

(58) Field of Classification Search
CPC . A45B 25/22; A45B 2023/0012; E04H 15/62; E04H 15/32; E04H 12/2215; E02D 5/80; A01B 1/02
USPC ............ 135/16, 118, 119, 96, 120.4, 902; 294/1.3, 1.5, 15, 19.3, 54.4, 144, 170, 294/180; 52/155, 156, 163; 24/129 B, 24/129 R, 130
See application file for complete search history.

(56) References Cited

U.S. PATENT DOCUMENTS

| | | | | |
|---|---|---|---|---|
| 4,363,198 A | * | 12/1982 | Meyer | E02D 5/80 52/155 |
| 4,924,893 A | | 5/1990 | Furey | |
| 4,993,768 A | * | 2/1991 | Ewen | A01B 1/20 238/14 |
| 5,095,573 A | * | 3/1992 | Henke | B44D 3/164 15/105 |
| 5,175,966 A | * | 1/1993 | Remke | E02D 5/80 405/244 |
| 5,461,833 A | * | 10/1995 | Murray | E02D 5/74 248/156 |
| 5,535,978 A | * | 7/1996 | Rodriguez | E04H 12/2269 135/118 |
| 6,964,277 B2 | * | 11/2005 | Naber | A45B 25/00 135/117 |
| 7,406,975 B1 | | 8/2008 | Carrier | |
| D671,390 S | * | 11/2012 | Ibarra | D8/349 |
| 9,428,933 B2 | * | 8/2016 | Simonson | E04H 15/62 |
| 2003/0024460 A1 | * | 2/2003 | Militello | B63B 21/26 114/294 |

(Continued)

*Primary Examiner* — Winnie Yip
(74) *Attorney, Agent, or Firm* — Global Intellectual Property Agency, LLC; Jordan Sworen

(57) ABSTRACT

A beach umbrella anchor with an integral shovel. The beach umbrella anchor has a central member with a handle at a first end and a shovel at a second end. An aperture is positioned in between the first end and the second end of the central member where a first end of a length of rope can be inserted and secured. A second end of the rope is then attached to a beach umbrella, which is planted in the ground. The shovel is used to dig a hole large enough to encompass the beach umbrella anchor, which is then buried within the hole. This securely anchors a beach umbrella such that it can stay in a desired position in windy conditions.

1 Claim, 2 Drawing Sheets

(56) References Cited

U.S. PATENT DOCUMENTS

| | | | |
|---|---|---|---|
| 2004/0089332 A1* | 5/2004 | Mandel | A45B 25/22 135/16 |
| 2004/0123886 A1 | 7/2004 | Naber | |
| 2006/0107979 A1* | 5/2006 | Kim | A45B 5/00 135/16 |
| 2007/0204891 A1 | 9/2007 | Lubyk | |
| 2013/0037066 A1 | 2/2013 | Dorr | |
| 2013/0051707 A1 | 2/2013 | Pisano et al. | |

* cited by examiner

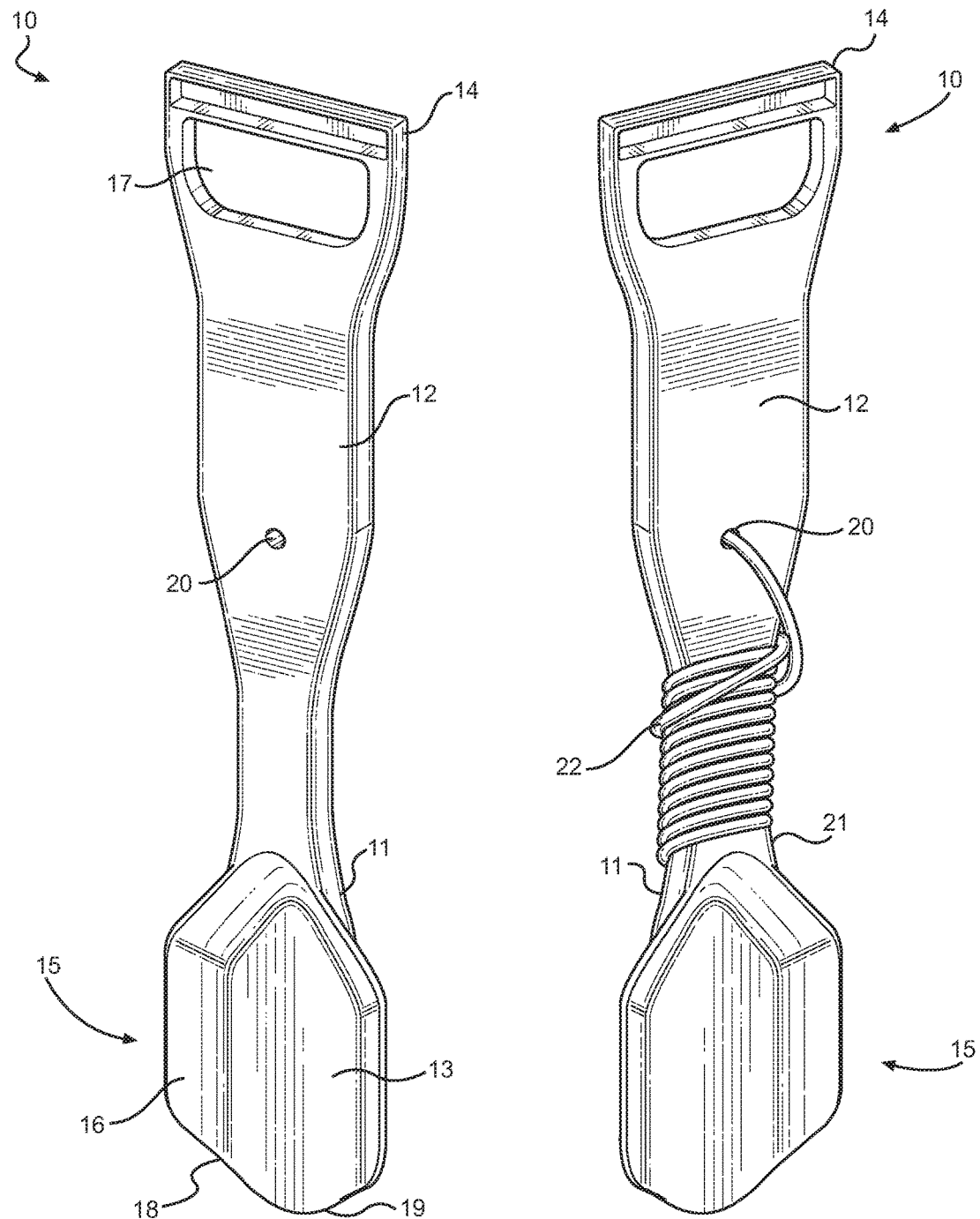

BEACH UMBRELLA ANCHOR WITH AN INTEGRAL SHOVEL

BACKGROUND OF THE INVENTION

The present invention relates to an anchoring device. More specifically, the present invention relates to an anchoring device designed to secure a beach umbrella in the ground.

Spending time at a beach during warm weather is a popular activity for many individuals. While the higher temperatures allow for enjoyment of the outdoors, specifically the enjoyment of waterfront and shoreline property, a hot sun beating down can be irritating and potentially dangerous. Extended exposure to sun can be uncomfortable, as well as cause overheating, sunburns and dehydration. A convenient device used to block the sun and create shade is a beach umbrella.

The beach umbrella is an oversized umbrella with a spiked end that is inserted into the ground and opened to create a portable canopy shielding individuals who are positioned underneath. However, because the umbrella is large, it is prone to catching gusts of wind and therefore be uprooted. This can be particularly problematic in beaches that are located in windier areas. If a gust of wind dislodges the umbrella from its location, it is not only an inconvenience for the umbrella users, but can potentially become a dangerous projectile to those in the immediate and extended surrounding areas.

Devices are known in the prior art that are designed to anchor down a beach umbrella. Some devices provide a bag that can be filled with heavy material and tethered to the pole of a beach umbrella. However, these devices only offer anchoring power commensurate with readily available material that can fit within the bag, which can be limiting in many situations. Other devices teach umbrellas having a shovel-like end attached directly to the umbrella pole. These devices can be cumbersome to use and are limited in that an umbrella pole must be lowered very deep into the ground to offer sufficient security in windy conditions. Additionally, many consumer beach umbrellas are made of a top pole portion and a top umbrella portion, and these devices are limited to securing the bottom pole portion without securing the top umbrella portion. Yet other devices offer simply tie-down ropes, which are limited to being used with a separate and potentially not readily available anchoring device.

SUMMARY OF THE INVENTION

In view of the foregoing disadvantages inherent in the known types of beach umbrella anchoring devices now present in the prior art, the present invention provides a beach umbrella anchor with and integral shovel wherein the same can be utilized for providing convenience for the user when wishing to secure a beach umbrella in windy conditions. The present system comprises a central member having a handle at one end and a shovel head an opposing end. There is an aperture placed along the central member, where a length of rope can be inserted therethrough. A first end of the rope is secured at the aperture while a second end is attached to a beach umbrella. The shovel head can be used to dig a hole, wherein the central member can be buried therein, thus conveniently and effectively anchoring a beach umbrella.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a perspective view of the beach umbrella anchor with an integral shovel.

FIG. 2 shows a perspective view of the beach umbrella anchor with an integral shovel having rope encircled around the central member.

DETAILED DESCRIPTION OF THE INVENTION

Figure 3:
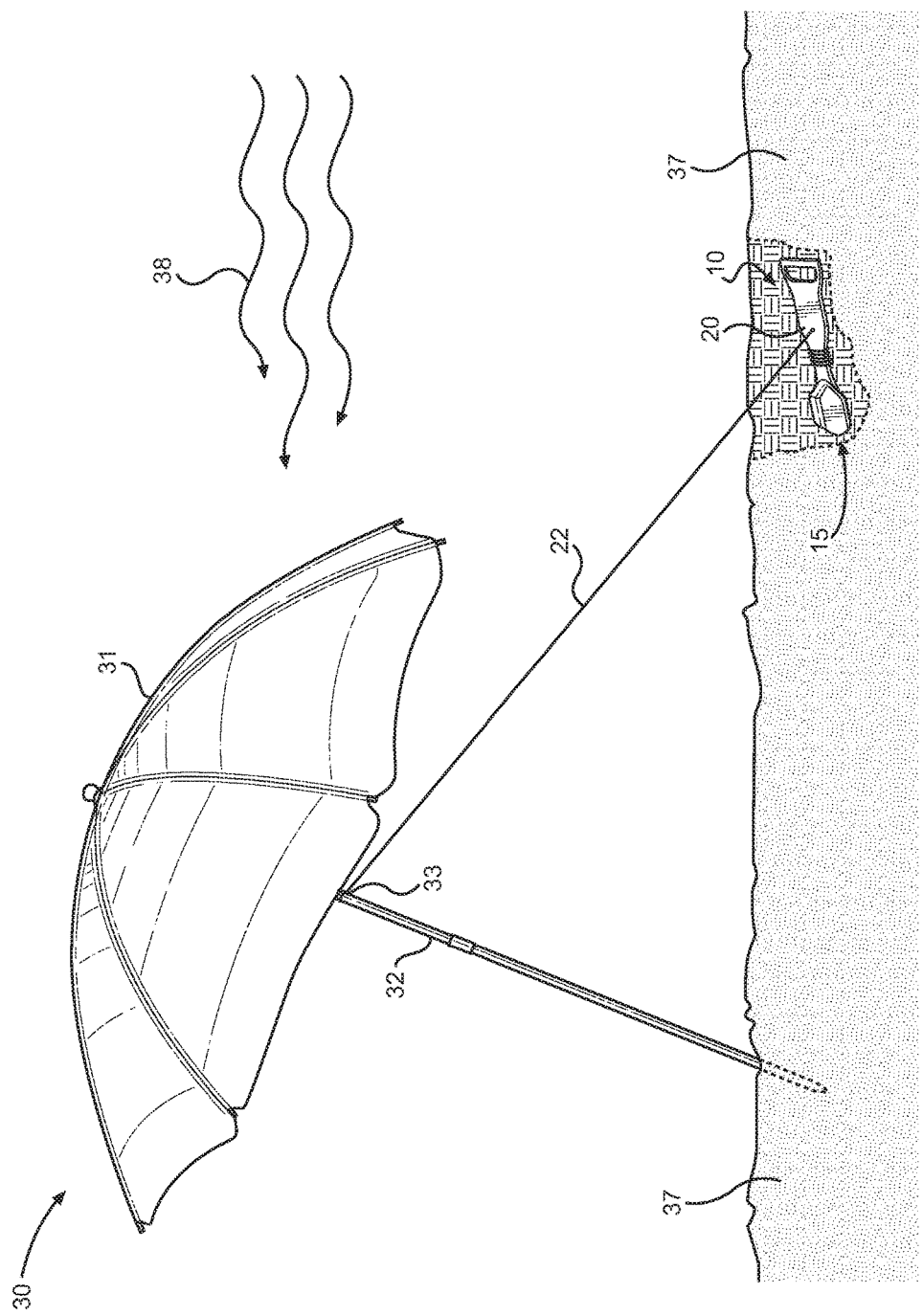
FIG. 3 shows a cut away view of the beach umbrella anchor secured to a beach umbrella and buried in sand.

Reference is made herein to the attached drawings. Like reference numerals are used throughout the drawings to depict like or similar elements of the beach umbrella anchor with an integral shovel. The figures are intended for representative purposes only and should not be considered to be limiting in any respect.

Referring now to FIG. 1, there is shown a perspective view of the beach umbrella anchor with an integral shovel. The beach umbrella anchor 10 comprises a central member 12 having a planar surface with a proximal end 14 and a distal end 11. An opening 17 is disposed at the proximal end 14, configured for a user's hand to fit therethrough in order to assist a user when digging. A shovel head 15 is positioned at the distal end 11, comprising a flat surface 13 with sidewalls 16 extending upwards from two edges and a rear edge of the flat surface 13. The shovel head 15 has an open end 18 positioned opposite the distal end 11 of the central member 12, wherein sidewalls are absent from the open end 18. In some embodiments of the beach umbrella anchor 10, the open end 18 of the shovel head 15 is configured in a pointed shape 19 in order to penetrate the ground more easily.

Referring now to FIG. 2, there is shown a perspective view of the beach umbrella anchor with an integral shovel having rope encircled around the central member. The central member 12 of the beach umbrella anchor 10 further comprises a central aperture 20 disposed at an intermediate position relative to the proximal end 14 and distal end 11 of the central member 12. A portion 21 of the central member 12 is narrowed, such that the width of that portion 21 is less than the width of the shovel head 15 and the proximal end 14.

The central aperture 20 is sized to receive a length of rope 22 therethrough. A first end of the rope 22 is configured to prevent the first end thereof from sliding through the central aperture 20. For example, in one embodiment of the beach umbrella anchor 10, a stopper element that is larger than the central aperture 20 is secured to the first end of the rope 22. In an alternative embodiment, the first end of the rope 22 is configured into a knot that is larger than central aperture 20, preventing the rope from sliding therethrough. When the rope 22 is not in use, it may be coiled around the narrow portion of the 21 central member 12 for convenient storage. The narrow shape of that portion juxtaposed with the wider distal end 14 and the wider shovel head 15 prevents the coil of rope from unexpectedly sliding off the central member 12 when not in use.

Referring now to FIG. 3, there is shown a cut away view of the beach umbrella anchor secured to a beach umbrella and buried in sand. In use, a beach umbrella 30 is inserted into the ground. For example, it may be driven into the sand 37 on a beach. The length of rope 22 is extended from the central aperture 20 of the beach umbrella anchor 10 and secured to the pole 32 of the beach umbrella 30. The beach umbrella anchor 10 is placed at a distance from the beach umbrella 30 so as to ensure that the rope 22 is held taught. The beach umbrella anchor 10 can then be fully buried in the sand 37, securing it in position. The beach umbrella 30 can be positioned such that the exterior of the umbrella portion 31 faces toward the wind 38, reducing the force applied from the wind to the umbrella. The rope 22 secured to the beach umbrella anchor 10 ensures that the beach umbrella is not uprooted by the wind.

The shovel head 15 of the beach umbrella anchor 10 may be used to dig a hole to place the beach umbrella anchor therein, offering a convenient tool that is integral with the beach umbrella anchor 10, and thus readily available. The embodiment of the shovel head 15 having a pointed shape at the open end thereof may offer enhanced digging abilities in certain sand conditions, allowing a user to dig a hole more efficiently than with a flat edged shovel.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for securing a beach umbrella into a ground, comprising the steps:

inserting the beach umbrella into the ground;

securing one end of a length of rope to the beach umbrella;

securing the other end of the length of rope to a beach umbrella anchor, the beach umbrella anchor further comprising:

a central member having a proximal end and a distal end;

a central aperture disposed on the central member at an intermediate position relative to the proximal end and distal end, wherein the rope is threaded through the central aperture and secured thereto;

a shovel head disposed at the distal end, wherein the shovel head further comprises a flat surface and sidewalls extending from two edges and a rear edge of the flat surface and further comprising an open end opposite the distal end of the central member;

digging a hole in the ground with the shovel head of the beach umbrella anchor, wherein the hole is dimensioned to fully bury the beach umbrella anchor therein; and burying the beach umbrella anchor within the hole.

* * * * *